(12) United States Patent
Danilov et al.

(10) Patent No.: US 11,210,179 B1
(45) Date of Patent: Dec. 28, 2021

(54) DISASTER RECOVERY IN A STREAMING DATA STORAGE SYSTEM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/154,274

(22) Filed: Jan. 21, 2021

(51) Int. Cl.
*G06F 11/14* (2006.01)
(52) U.S. Cl.
CPC ...... *G06F 11/1464* (2013.01); *G06F 11/1451* (2013.01); *G06F 11/1469* (2013.01)
(58) Field of Classification Search
CPC ............. G06F 11/1451; G06F 11/1464; G06F 11/1469
See application file for complete search history.

(56) References Cited

U.S. PATENT DOCUMENTS 7,843,830 B1 * 11/2010 Subramanian ........ H04L 1/1887
370/235

* cited by examiner

*Primary Examiner* — Joseph R Kudirka
(74) *Attorney, Agent, or Firm* — Amin, Turocy & Watson, LLP

(57) ABSTRACT

A streaming data storage system maintains a hierarchical structure of metadata in association with the data chunks of streams, in which the metadata facilitates recovery of the data streams if the streaming data storage system fails. In one implementation, the metadata comprises the pathnames and filenames of the chunks stored in a file storage system or object storage system, in which each pathname represents the epoch and segment of the chunks in the segment, and the chunks' filenames represent the relative ordering of the chunks in the segment. To recover the data stream, the epochs and their segments are recreated, and the segments are repopulated with references to their respective chunks. Once recovered, a new epoch is created with a number of active segments equal to the number of segments of the last recreated epoch, and event appends to the data stream can resume.

20 Claims, 12 Drawing Sheets

DISASTER RECOVERY IN A STREAMING DATA STORAGE SYSTEM

TECHNICAL FIELD

The subject application relates generally to data storage, and, for example, to a technology that recovers a data stream of event data in storage systems that implement data streams for storing and serving continuous and unbounded data, and related embodiments.

BACKGROUND

Some contemporary data storage systems, such as DELL EMC's PRAVEGA system/data storage service, store data in a storage abstraction referred to as a data stream, or more simply, a stream. A stream is identified with a name, and can store continuous and potentially unbounded data; more particularly, a stream comprises a durable, elastic, append-only, sequence of stored events. New events are added to a tail (front) of a stream. As can be readily appreciated, PRAVEGA is thus ideal for IoT (Internet of Things) data, where devices/sensors may generate thousands of data points per second. Notwithstanding, PRAVEGA may be highly beneficial for storing data corresponding to more traditional workloads, such as financial trading data that regularly changes.

One stream may be divided into one or more segments, with each new event appended by a writer application to a segment that is determined based on a hash computation of a routing key associated with that event. Once written, the events in a stream/stream segment are immutable and cannot be modified.

In general, a streaming data storage system keeps a small amount of fresh data in Tier-1 storage, which provides efficient access to the data for processing. Older data is aggregated into chunks and written to an object storage system (e.g., DELL EMC ECS) or to a file storage system (e.g., DELL EMC ISILON), where a chunk comprises an ordered list of events from one segment, stored in Tier-2 storage (e.g., in a cloud). For example, PRAVEGA works as a Tier-1 of a multi-tiered system and the file/object storage system works as a Tier-2 storage. Therefore, PRAVEGA implements automatic tiering for stream data.

The event data of a data stream can be retained indefinitely. However, it is possible that a streaming data storage system can fail, resulting in its data streams being lost, as some users of a data streaming storage system have a standalone data streaming storage system and/or no replication of the data stream. After such a failure, the event data in Tier-2 storage chunks still physically exists, but such data is now simply raw data that can no longer be interpreted, even when a new instance of the streaming data storage system is restarted.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards configuring/associating the chunks of a data stream with metadata that allows the data stream to be recovered following failure of the data streaming storage system that maintained the data stream. In one implementation, the metadata is based on the hierarchical aspects of a file system, in conjunction with a naming convention, in which the directory path to each chunk and the chunk's filename contain the information from which the data stream can be recovered. For example, the file system's directory pathname for a data stream can comprise the epoch and segment associated with each chunk, and the name of each chunk can establish the order of that chunk relative to any other chunks in the segment (that is, within the same "epoch/segment" pathname). Then, if needed to recover the data stream, the pathnames to the chunks are used to recreate the epochs and segments, and the filenames of the chunks are used to populate the segments with references to the chunks, in order, whereby the older events are readable in the proper order.

It should be understood that any of the examples herein are non-limiting. For instance, some of the examples are based on PRAVEGA data storage technology, which, for example, maintains event data in data chunks in Tier-2 (e.g., cloud) storage as files; however virtually any stream-based data storage system may benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations may be shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
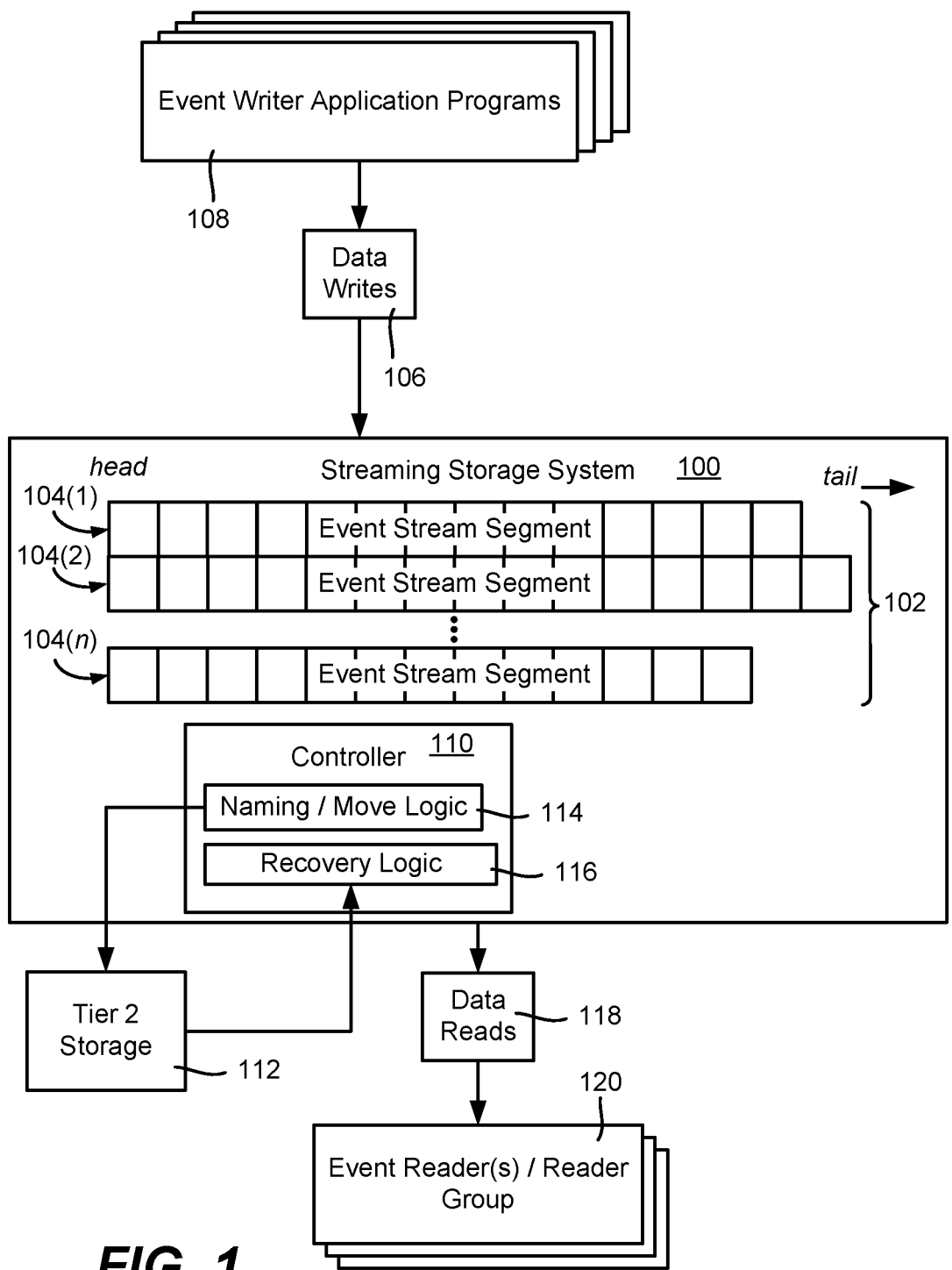
FIG. 1 is a block diagram representation of example components and data-related operations in a streaming data storage system in which events corresponding to epochs and segments are moved to Tier-2 storage using a hierarchal naming system, in accordance with various aspects and implementations of the subject disclosure.

FIG. 1 shows a streaming data storage system 100 that maintains segments of streamed data events of a data stream 102 comprised of multiple segments 104(1)-104(n). In general, data writes 106 received from one or more streaming application programs (event writers) 108 are appended to the tail of one of the segments based on a routing key associated with each event; (as is known, a conventional event comprises a routing key along with the event data contents to be stored; the event data contents are alternatively referred to herein as the payload). The routing key is hashed to a value that determines the segment.

In general, a controller 110 (or other similar component) moves older event data (from the data stream head) from Tier-1 storage to data chunks in Tier-2 storage 112, such as based on administrator (or default) set policy. As described herein, the controller 110, via naming/move logic 114, names and moves the data chunks to the Tier-2 storage 112 in a way that allows recovery logic 116 to recover the (typically) major part of the data stream from the Tier-2 storage 112. Note that FIG. 1 shows a single data stream 102, however the streaming data storage system 100 can create and maintain any practical number of data streams.

Recovery allows data reads 118 of the older, recovered data events to occur by event readers/reader groups 120 that consume and process the data events' payloads. Note that in general, the event readers 120 do not know whether an event is maintained in Tier-1 storage or the Tier-2 storage 112, however the recovered data events in Tier-2 storage are no longer lost after recovery.

As described herein, the way in which the chunks containing data stream events are stored in Tier-2 storage facilitates recovering data after a failure of the streaming data storage system 100. The technology facilitates recovery of a (typically major) part of stream data, even after a complete loss of the streaming data storage system 100. Note that recovery as described herein refers to restoring the part of the data stream(s) that are in Tier-2 storage chunks, which can be most, if not all, of the data streams' data; complete recovery is feasible for an active data stream if the events in Tier-1 storage, generally relatively few in number compared to the amount of the events in the Tier-2 storage chunks, are protected in some way.

The technology described herein is based, in part, on the high likelihood that the major part of a stream's data of the streaming data storage system 100 resides outside the streaming data storage system's Tier-1 storage, in the Tier-2 storage system 112, e.g., in a cloud. The technology described herein is directed towards a way to correctly interpret the data saved in the Tier-2 storage 112, which thereby recovers the major part of the data stream(s) of the streaming data storage system 100.

It should be noted that the streaming data storage system 100 may use any file storage system or any object storage system as the Tier-2 storage 112. What file storage systems and object storage systems have in common is a support of a hierarchical view on data. In other words, the Tier-2 storage supports directories (also known as folders). In one implementation, the hierarchical structure of such directories is leveraged to describe the content of data chunks created by the streaming data storage system 100.

Figure 2:
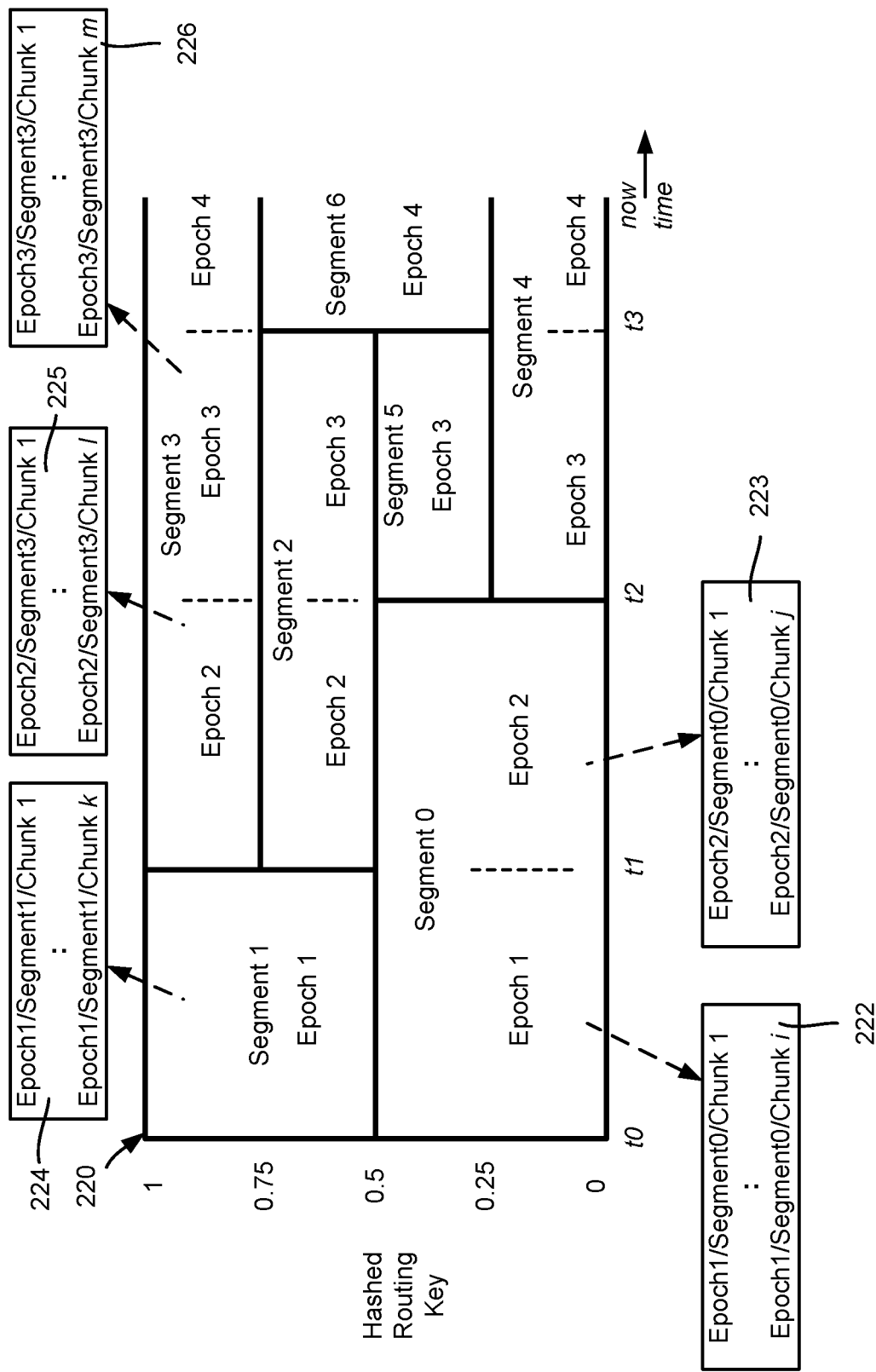
FIG. 2 is a representation of an example data stream's segments changing over time due to scaling events (splits or merges), and how epochs and segments that contain data chunks can be named according to a hierarchical structure, in accordance with various aspects and implementations of the subject disclosure.

FIG. 2 shows additional details of segments of data stream 220 as described herein, in which new events are appended to the end (tail) of a stream. As described herein, each ordered event comprises a routing key and an event payload. The routing key can be named by the user, and is often derived from data naturally occurring in the event, e.g. "device-id" of the device that generated the event; should the user not specify a routing key, a routing key can be randomly assigned by the streaming data storage system. Events are ordered per routing key, and can be read in append order by a conventional reader.

As shown in FIG. 2, the data stream 220 is split into segments, which are logical containers for the events within the data stream 220. When a new event is written to a stream, the event is stored to one of the segments based on the event's routing key. As can be seen in FIG. 2, event routing keys are hashed (using consistent hashing) to form a "key space" which corresponds to the number of segments; for example Segment 1 contains events with routing keys that hash between 0.5 and 1.0.

FIG. 2 also shows that data streams such as the data stream 220 are elastic, as the streaming data storage system can change a data stream's number of segments over time. The streaming data storage system monitors the usage of each of the stream's segments and decides whether those segments need to be scaled, meaning split or merged, e.g., based on the current event ingestion rate. A segment split creates two or more successor segments that (e.g., evenly) split a predecessor segment's routing key space. A segment merge combines two or more predecessor segments that are assigned to adjacent routing key spaces and creates a lesser number (typically one) successor segment that is assigned to the combined routing key space of the original predecessor segments. This elasticity of scaling allows data streams to react to changes in ingestion patterns (more segments are created when ingestion throughput increases and fewer segments are used when ingestion drops down).

When a data stream is created, and each time a scaling event occurs with respect to the data stream, a new epoch is created. By way of example, the data stream 220 starts with two parallel segments, Segment 1 and Segment 0, at an initial epoch, epoch 1. At time t1, Segment 1 is split, with Segments 2 and 3 as successors, resulting in epoch 2 being created. At time t2, Segment 0 is split, with Segments 4 and 5 as successors, creating epoch 3, and at time t3, Segments 2 and 5 are merged with Segment 6 as a successor, creating epoch 4. As described herein, the epochs of a data stream are uniquely identified, which in one implementation is based on sequentially numbering the epochs' names, in the order of their creation. Further, the segments of the data stream have unique segment identifiers, which in one implementation are based on numbering segment identifiers (names) sequentially, in the order of segment creation.

Thus, an epoch can be identified by a number that is unique within the epoch's stream, such as a sequential number that is incremented whenever a new epoch is created. Similarly, the segments of a data stream can be identified by a unique segment number (e.g., an increasing sequential number upon segment creation) in their data stream as well, rather than being identified by their sequential number within an epoch. As one segment, such as the Segment 0 in FIG. 2, may survive one or more epochs, in such a scheme more information about the stream structure throughout the various epochs can be determined from the segment's number. Note that there is no information about ranges of hashed routing keys associated with segments, however this information is needed for new events only, and is not needed for historical data.

In one implementation, when the events of the data stream are moved to Tier-2 storage, the chunks that maintain the events are named with a file system pathname based on the epochs and the segments associated with those epochs, with chunk filenames that represent the ordering of the chunks of each segment. For example, the group of data chunks (chunk 1-chunk i) represented by the block 222 each have as their file system directory pathname Epoch1/Segment0/, followed by the chunks' filenames. In one implementation, the filenames of the chunks represent the order of the chunks, that is, corresponding to the order of the events relative to one another within the chunks. For example, Epoch1/Segment0/Chunk1 contains that epoch's and segment's events, in appending order, prior to the events of Epoch1/Segment0/Chunk2, and so on. For clarity, not all of the pathnames for the epochs and segments shown in FIG. 2 are shown with their corresponding set of data chunks, however the blocks 222-226 depict some of the epoch and segment pathnames, and each of their data chunks' filenames.

Thus, in contrast to existing streaming data storage systems, as described herein, in one implementation, chunks of a data stream can have meaningful names that produce a hierarchical structure of data. Note that a data stream is identified by a name (preferably, a meaningful string). Further, multiple data streams, each with a different name, can be organized within a scope (a namespace). A scope also can be identified by a meaningful name, and there can be multiple scopes managed by the streaming data storage system.

Figure 3:
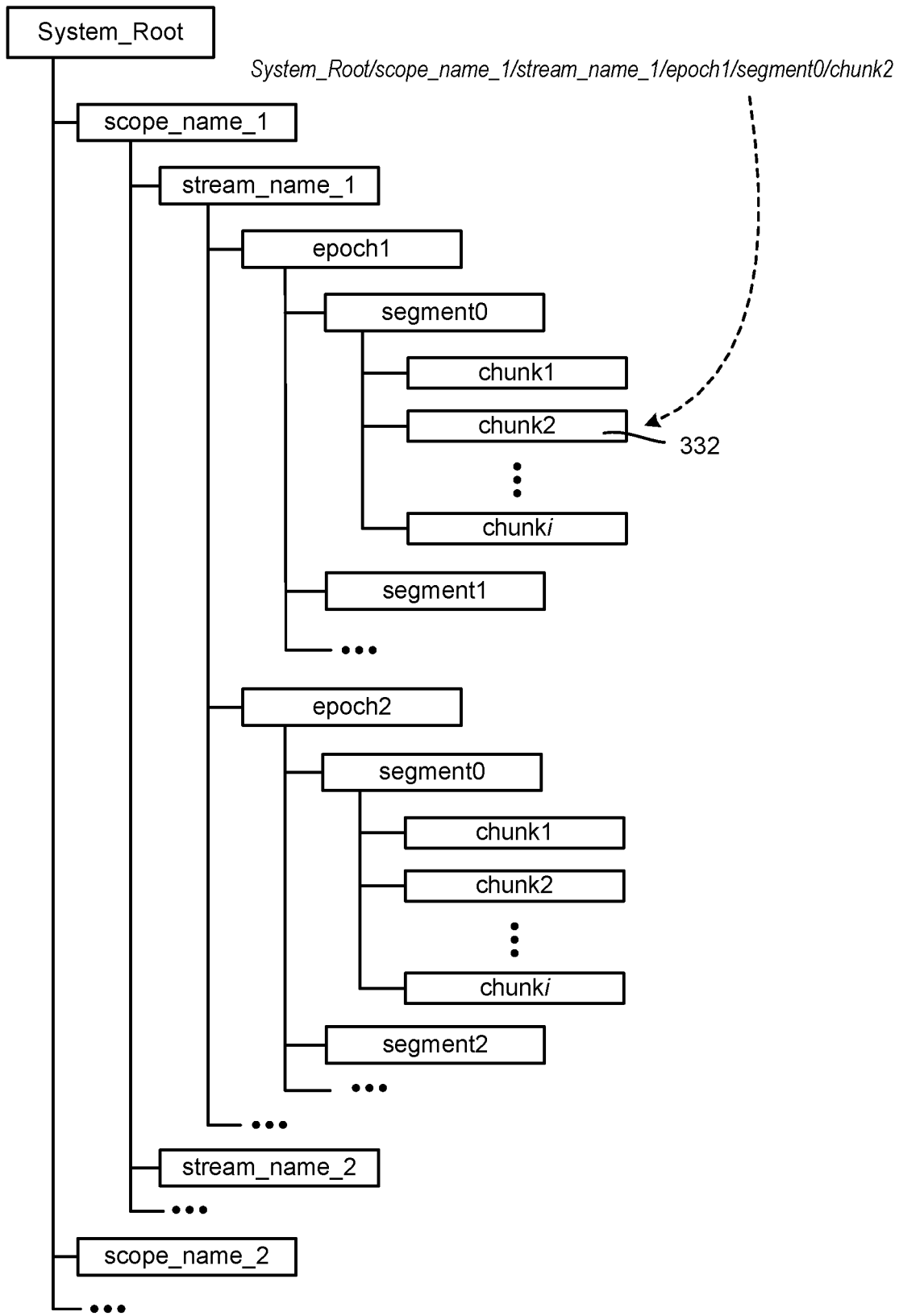
FIG. 3 is a representation of example hierarchical structure of scores, streams, epochs, segments and chunks which facilitates data recovery, in accordance with various aspects and implementations of the subject disclosure.

The example of FIG. 3 shows a hierarchical structure in which each chunk name describes where that chunk fits into the data stream. By way of example, the name (including pathname and filename) of one of the chunks 332 in FIG. 3 is shown, in conjunction with its scope name and stream name, as: System_Root/scope_name_1/stream_name_1/epoch1/segment0/chunk2. Therefore, each chunk name describes data stored within the chunk, as well as defining the correct order of events stored to different chunks.

Thus, for each scope and data stream in that scope, the chunks from different epochs and segments can be ascertained from their directory location (pathname), and within that directory pathname chunks can be sequentially numbered locally, at the directory location level. As one benefit, this tends to make full names of chunks somewhat shorter than having a unique identifier per chunk filename, as the pathname is part of a chunk's unique identifier as described herein.

It should be noted that while the hierarchical structure of the chunks' pathnames and filenames can be used to recreate the epochs, segments and the ordering of chunk (event) data within each segment, this is only one very convenient and practical solution that leverages an already existing filesystem's hierarchy. Indeed, as each chunk needs a unique name, the pathname and filename provide a straightforward, easy to understand solution. An alternative includes separately maintaining (e.g., in Tier-2 cloud storage) basically the same metadata that is needed to recreate the epochs, segments and chunk ordering. For example, the streaming data storage system can maintain a key-value store (or stores) that maps more conventional chunk names to the epoch, segment and order information for that chunk/data stream. Another alternative is to maintain the scope name, stream name, epoch, segment and relative chunk ordering within the segment as part of the information in a chunk header for each chunk.

Figure 4:
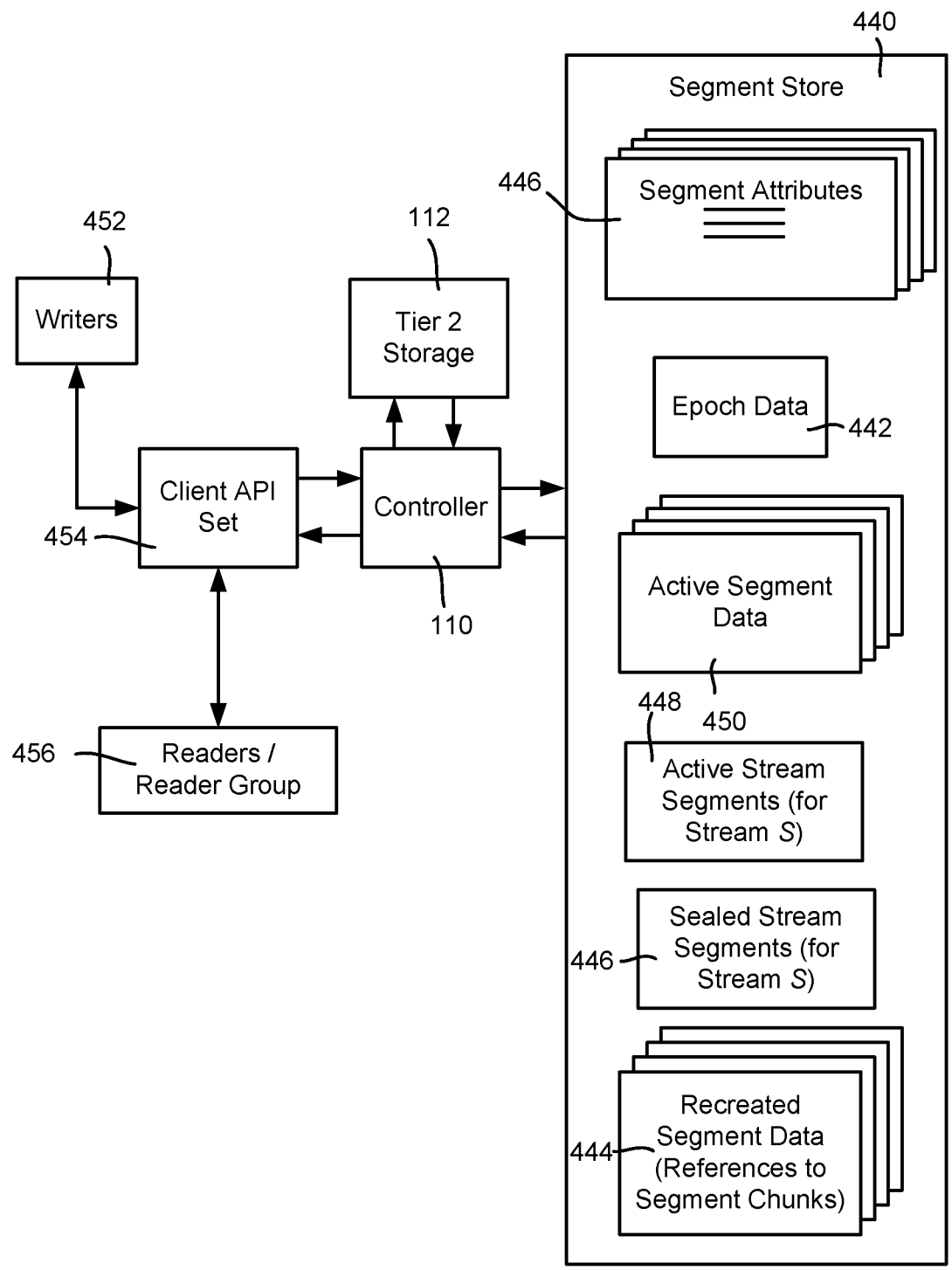
FIG. 4 is an example representation of example components and data structures that can be used to recover a data stream, and prepare for appending new events to the data stream, in accordance with various aspects and implementations of the subject disclosure.

Turning to recovery-related operations after the streaming data storage system fails and a new instance thereof restarted, FIG. 4 depicts some of the data structures that the controller 110 can recreate from the pathnames and filenames of the chunks, (once the streaming data storage system is again operational a failure). Note that although the example data structures are shown as being stored in a segment store 440, the data structures can be stored in any suitable location.

In the example of FIG. 4, each epoch's directory contains references to its segments, and thus epoch data 442 is recreated to relate the various epochs, recreated during recovery as described herein, to each of their segments. Each of the segments 444 is recreated as well, in association with the segment's epoch, and contain references to their chunks. Segment attributes 446, such as the length of each segment, can be obtained based on the data in a segment's chunk(s).

As described herein, after the recovery the controller 110 seals the recreated segments 444, e.g., identified via a data structure 446, and thus allows no further appends to those segments. New active segments are created for storing further appends, as identified via block 448, corresponding to active segment data 450.

Once recovered, writers 452, via an API call to a client component 454, can write new events (have them appended to) to the active segments 450. Readers 456, via the client component 456, can read from the active segment data 450 as well as from the recreated segment data 444, via the references to the chunks that contain the event data.

Figure 5:
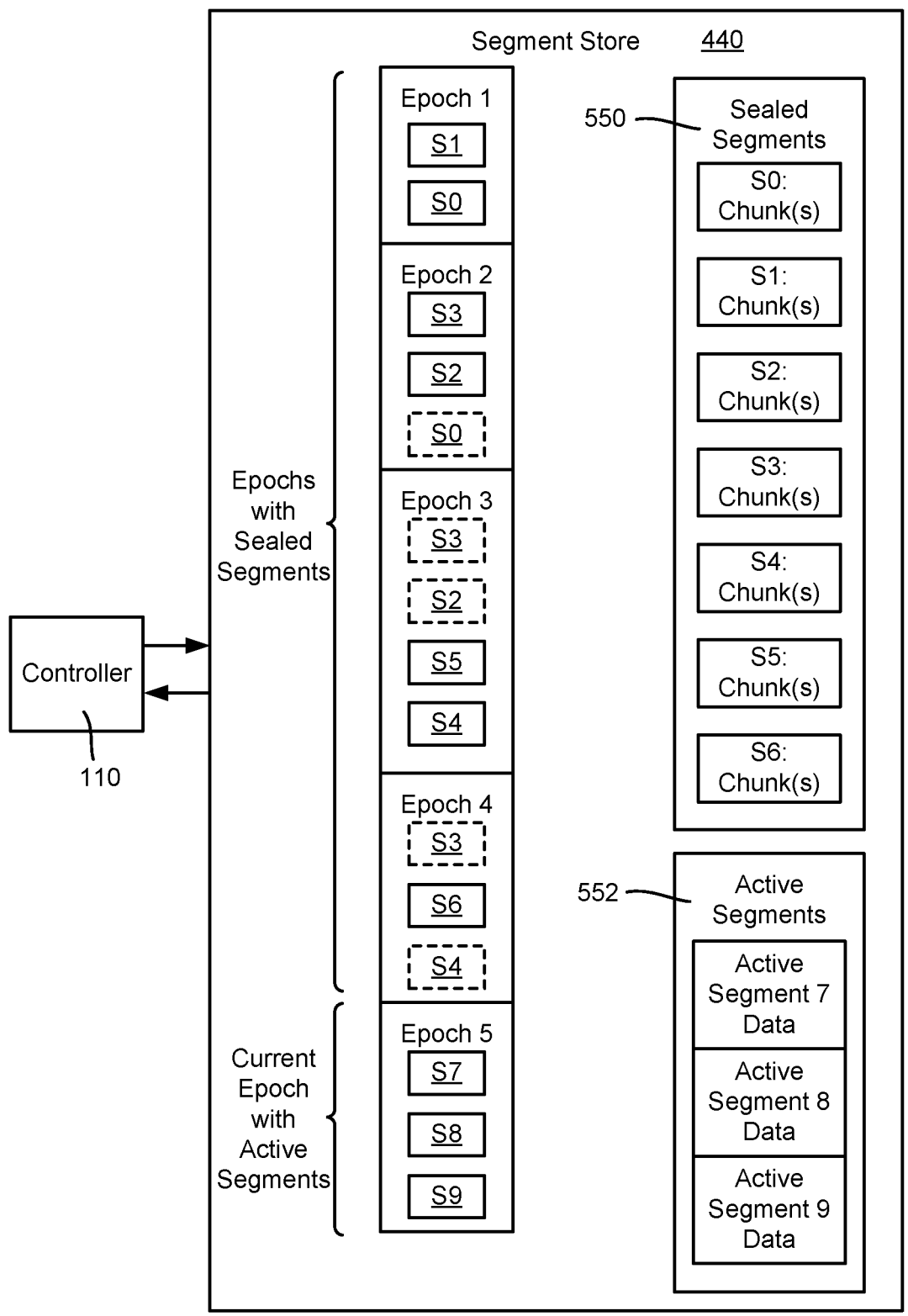
FIG. 5 is an example representation of epoch and segment data structures that can be used to recover a data stream, and prepare for appending new events to the data stream, in accordance with various aspects and implementations of the subject disclosure.

FIG. 5 shows some of the data structures generally corresponding to the data stream 220 of FIG. 2. Consider that, for example, events were stored in Tier-2 storage up to and including Epoch 4. Using a hierarchical directory structure such as shown in FIG. 3, it is seen that Epoch 1 is recreated with recreated segments S1 and S2, Epoch 2 is recreated with recreated segments S3 and S2, plus (previously existing) segment S1, and so on. During recreation of a segment, that segment is populated with references to its chunk(s) as described herein.

As also described herein, after recovery, the recreated segments are sealed (block 550), and a new Epoch 5 is created with active segments. The number of segments is the same number that existed in the last epoch, which in this example is Epoch 4, and which had three segments (S3, S6 and S4), whereby segments S7, S8 and S9 are created as the active segments (block 552) of newly created Epoch 5.

Note that while one chunk belongs to one stream segment, the chunk may store events from two or more successive epochs. In such a situation, the home directory of a chunk can be derived using the epoch of the first event within the chunk. Further, a segment may create no chunks for some epoch N, but have chunks created for neighboring epochs N−1 and N+1.

Figure 6:
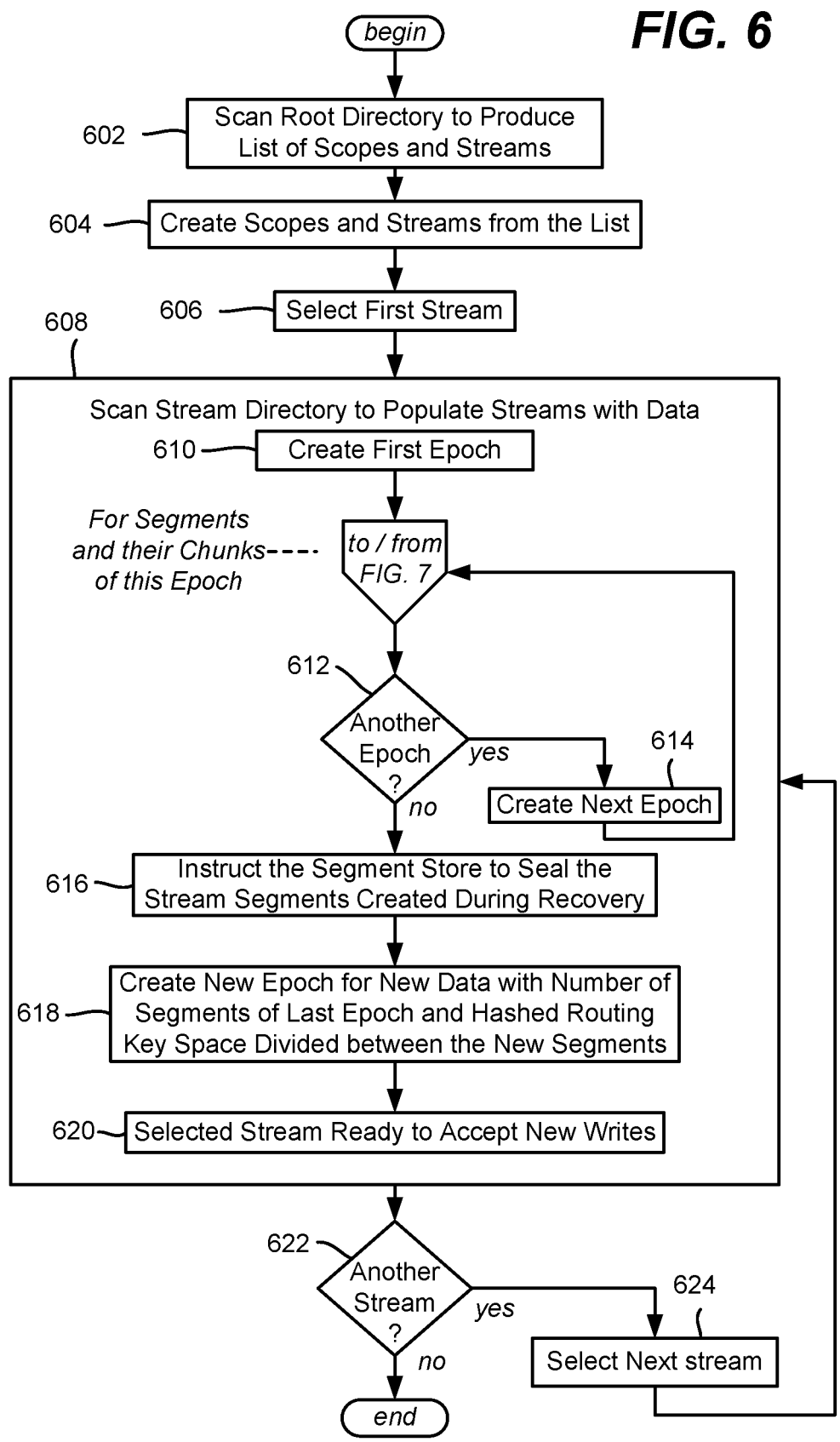
FIGS. 6 and 7 comprise a flow diagram showing example operations related to recovering a data stream, in accordance with various aspects and implementations of the subject disclosure.
Figure 7:
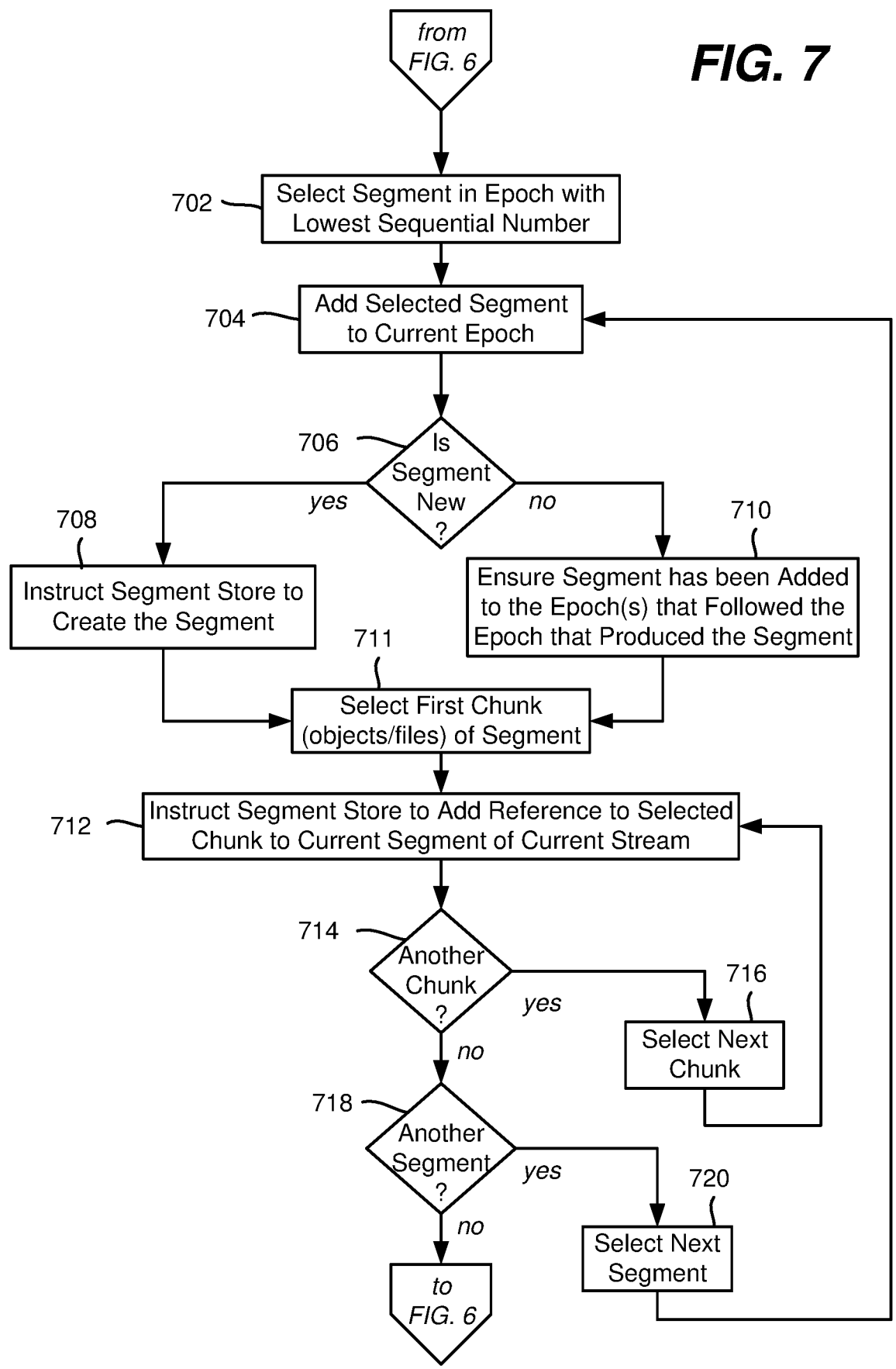

FIGS. 6 and 7 comprise a flow diagram of example operations of a data recovery procedure, as well as operations thereafter, as described herein. In a typical scenario, the system administrator commences the recovery procedure by identifying the system root directory (folder) within the Tier-2 storage system to be recovered.

In general, the procedure is driven by the controller, which begins at operation 602 by scanning the first two levels of the system root directory to produce a list of scopes and streams. At operation 604, the controller creates the scopes and streams from the list, and operation 606 selects a first stream.

Once the list of scopes and streams is obtained, it should be noted that recovery can be performed for multiple data streams in parallel or substantially in parallel. Further, subsets of the data streams can be recovered in parallel, such as if insufficient computing resources are available to recover all the data streams of all the scopes in parallel. As such, once a first stream is selected, the operations in block 608, including those of FIG. 7, generally refer to recovery of one such data stream; operations 622 and 624 can represent generally parallel selection of the next stream(s) and so on, or can represent recovering as little as a single data stream at a time.

In general, via the example operations in block 608, including those of FIG. 7, the controller scans each stream directory to populate streams with data. For the selected stream, at operation 610 the controller handles epochs in the natural order, starting with epoch 1, and creates the first epoch.

In this example, for each epoch starting with the first epoch, the operations of the controller branch to FIG. 7, where the controller handles segments in their natural order, starting by selecting the segment with the lowest sequential segment number at operation 702. At operation 704, the controller adds the segment to the current epoch.

At operation 706, the controller checks if the segment is new, that is, whether the segment was created for the current epoch. This can be easily using the segment's sequential number, because the sequential numbers of segments in the data stream increase over time.

If the segment is new, at operation 708 the controller instructs the segment store to create the segment. If the segment is not new, that is, was created for a previous epoch, at operation 710 the controller makes sure the segment reference has been added to the appropriate epoch(s), that is, those that follow the epoch that had produced the segment.

For each segment, the controller handles chunks (objects/files) in their natural order, starting with chunk 1, as represented by operation 711. At operation 712, the controller instructs the segment store to add the current chunk (that is, the reference to the chunk) to the currently selected segment of the current stream. Operations 714 and 716 repeat the process for each other chunk of the selected segment until none remain for the selected segment.

When the segment has been populated with chunk reference(s), operations 718 and 720 select the next segment for this epoch, and so on until none remain to be repopulated. When none remain, operation 718 returns the process to operation 612 of FIG. 6, which, in conjunction with operation 614, create the next epoch and so on, until none remain.

When the epochs have been recreated with their recreated segments, and the segments repopulated as described herein, at operation 616 the controller instructs the segment store to seal the stream segments created during the recovery procedure. As described above with reference to FIG. 5, at operation 618 the controller creates a new epoch for new data, which is created with the same number of segments that last epoch had; in one implementation, the hashed routing key space is divided evenly between the new segments, which can later be changed via a scaling event. As represented by operation 620, the data stream is now ready to accept new writes.

Apart from data, streams may also have other configuration data (e.g., data expiration policies, data retention policies, access control lists, and the like). After a failure and recovery, the administrator may restore the configuration manually. Alternatively, this information can be stored in chunks in some system stream. The full-dump approach can be used for configurations with small footprints. If the total size of streams' configuration exceeds a predefined threshold (e.g., 4 MB), the streaming data storage system may switch to a full-dump with increments approach. When the configuration is available from the Tier-2 storage, the recovery procedure described herein can utilize the configuration data to recover the various streams' configurations as well.

Figure 8:
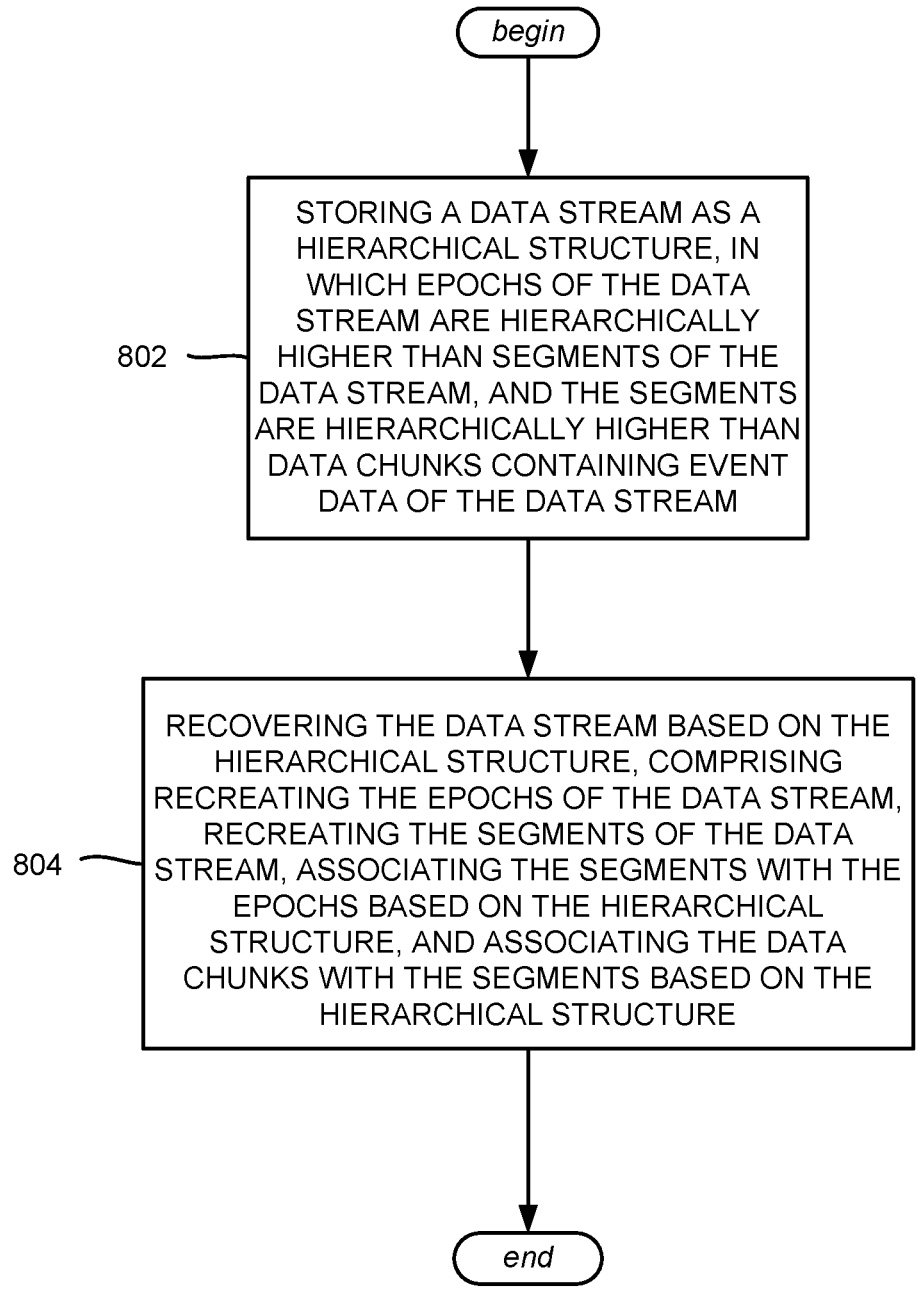
FIG. 8 is a flow diagram showing example operations related to storing a data stream as a hierarchical structure, and using that hierarchical structure to recover the data stream, in accordance with various aspects and implementations of the subject disclosure.

One or more aspects can be embodied in a system, such as represented in FIG. 8 and for example can comprise a memory that stores computer executable components and/or operations, and a processor that executes computer executable components and/or operations stored in the memory. Example operations can comprise operation 802, which represents storing a data stream as a hierarchical structure, in which epochs of the data stream are hierarchically higher than segments of the data stream, and the segments are hierarchically higher than data chunks containing event data of the data stream. Operation 804 represents recovering the data stream based on the hierarchical structure, comprising recreating the epochs of the data stream, recreating the segments of the data stream, associating the segments with the epochs based on the hierarchical structure, and associating the data chunks with the segments based on the hierarchical structure.

The hierarchical structure can correspond to a file system, in which the epochs and segments form directories of the file system, and in which the data chunks are files within the directories.

Each epoch can be identified by a sequential number in the data stream. Each segment can be identified by a sequential number in the data stream. A segment can be associated with two or more epochs.

Recreating the segments of the data stream can comprise determining whether a segment was created for an epoch, and, in response to determining that the segment was created for the epoch, instructing a segment store to create the segment in association with the epoch.

Recreating the segments of the data stream can comprise determining that a segment was created for a first epoch, and, in response to determining that the segment was created for the first epoch, adding an identifier of the segment to a second epoch following the first epoch.

Further operations can comprise sealing the segments, and creating a new epoch with a number of new segments corresponding to a number of segments of a last recreated epoch. Further operations can comprise dividing a routing key space evenly among the number of new segments. Further operations can comprise receiving an event comprising a routing key and payload, hashing the routing key to determine a matching segment to which the event is mapped, and appending the payload to the matching segment.

Figure 9:
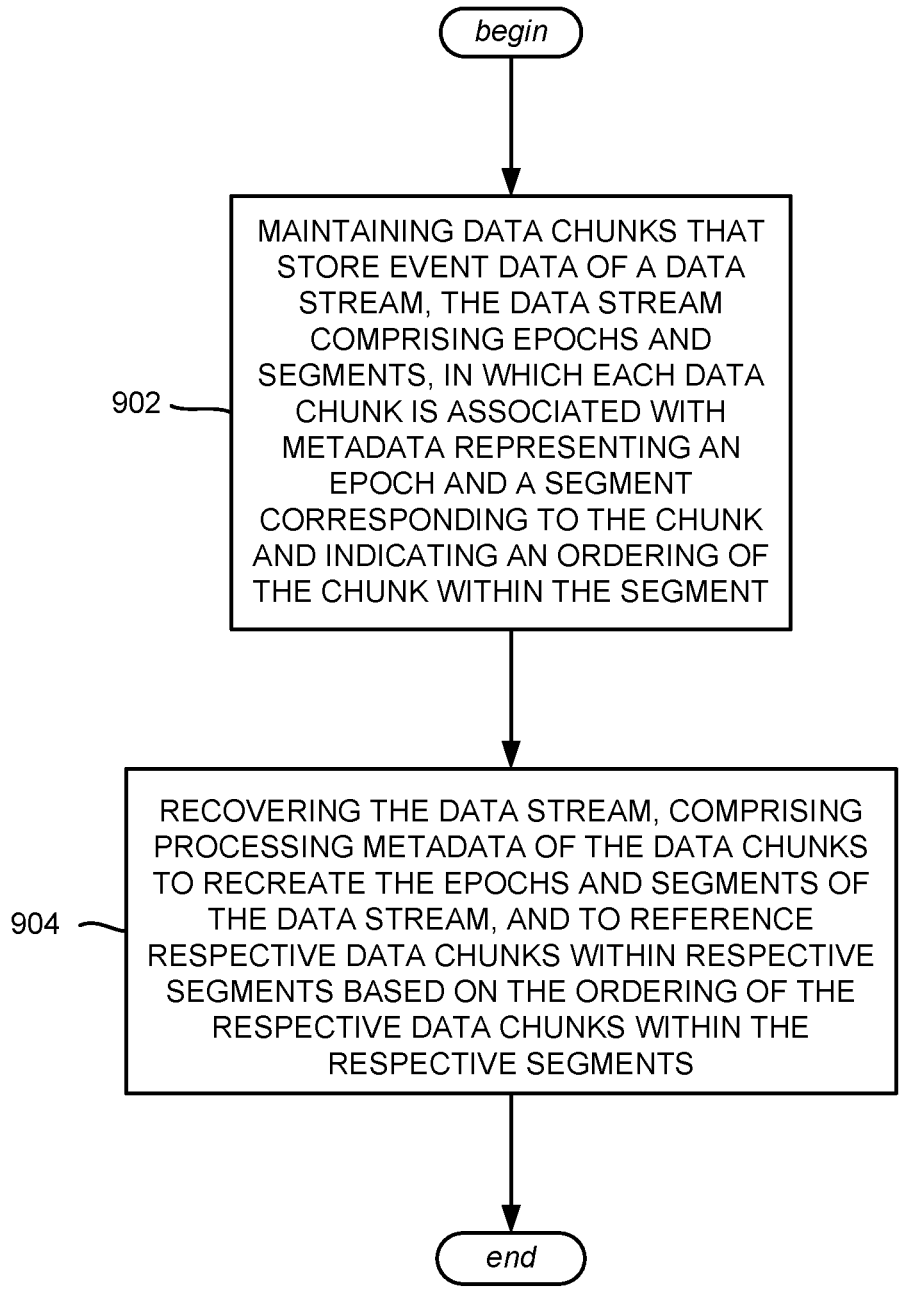
FIG. 9 is a flow diagram showing example operations related to maintaining metadata of data chunks and using that metadata to recover the data stream, in accordance with various aspects and implementations of the subject disclosure.

One or more aspects can be embodied in a system, such as represented in FIG. 9, and for example can comprise a memory that stores computer executable components and/or operations, and a processor that executes computer executable components and/or operations stored in the memory. Example operations can comprise operation 902, which represents maintaining data chunks that store event data of a data stream, the data stream comprising epochs and segments, in which each data chunk is associated with metadata representing an epoch and a segment corresponding to the chunk and indicating an ordering of the chunk within the segment. Operation 904 represents recovering the data stream, comprising processing metadata of the data chunks to recreate the epochs and segments of the data stream, and to reference respective data chunks within respective segments based on the ordering of the respective data chunks within the respective segments.

The metadata associated with a chunk can comprise a directory pathname and a filename, the directory pathname representing the epoch and segment of the chunk, and the filename of the chunk indicating the ordering of the chunk within the segment.

A segment can be identified by a data stream unique value that indicates a relative order of segment creation.

Further operations can comprise sealing the segments, and creating a new epoch with a number of new segments corresponding to a number of segments of a last recreated epoch.

Figure 10:
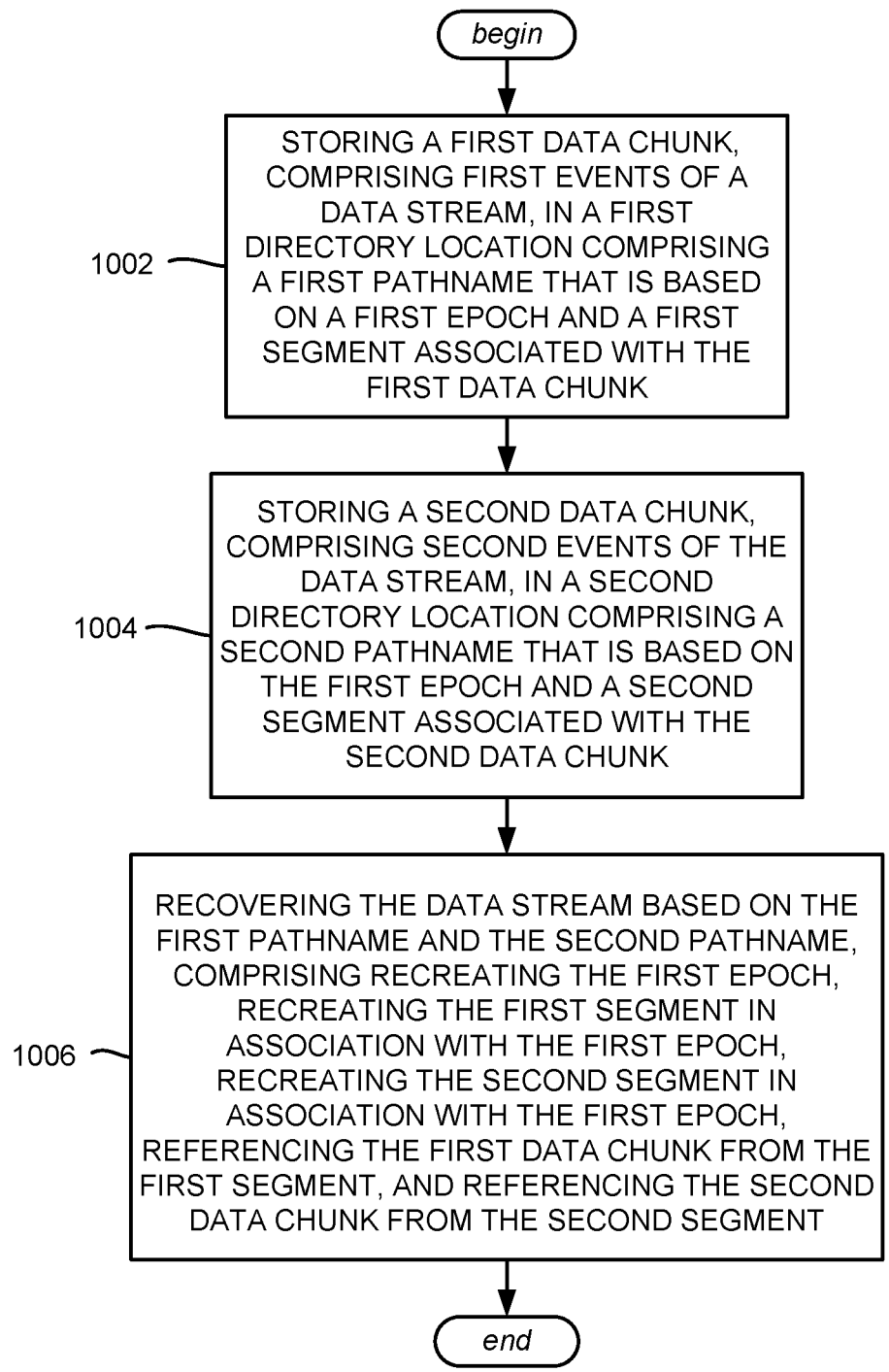
FIG. 10 is a flow diagram showing example operations related to storing data chunks in directory locations based on pathnames representing epochs and segments of a data stream, and recovering the data stream based on the pathnames, in accordance with various aspects and implementations of the subject disclosure.

FIG. 10 summarizes various example operations, e.g., corresponding to a machine-readable storage medium, comprising executable instructions that, when executed by a processor of a streaming data storage system, facilitate performance of operations. Operation 1002 represents storing a first data chunk, comprising first events of a data stream, in a first directory location comprising a first pathname that is based on a first epoch and a first segment associated with the first data chunk. Operation 1004 represents storing a second data chunk, comprising second events of the data stream, in a second directory location comprising a second pathname that is based on the first epoch and a second segment associated with the second data chunk. Operation 1006 represents recovering the data stream based on the first pathname and the second pathname, comprising recreating the first epoch, recreating the first segment in association with the first epoch, recreating the second segment in association with the first epoch, referencing the first data chunk from the first segment, and referencing the second data chunk from the second segment.

Further operations can comprise storing a third data chunk in a third directory location comprising the first pathname, the third data chunk comprising third events of the data stream, wherein the name of the first data chunk within the first pathname and the name of the third data chunk within the first pathname indicates that the first events the data stream are prior to the third events of the data stream.

Further operations can comprise determining that the recovering of the data stream is complete, and, in response to the determining that the recovering of the data stream is complete, creating a new epoch with a number of active segments corresponding to a number of segments of a last recreated epoch.

Further operations can comprise sealing the segments of the last recreated epoch. Further operations can comprise dividing a routing key space evenly among the number of active segments. Further operations can comprise receiving an event comprising a routing key and payload, hashing the routing key to determine a matching active segment to which the event is mapped, and appending the payload to the matching active segment.

The technology described herein for disaster recovery is practical to implement. The technology allows recovery of the major part of stream data even after a complete loss of a storage data storage system. The technology can be based on intelligent naming of the data chunks of stream data stored within a Tier-2 storage system.

Figure 11:
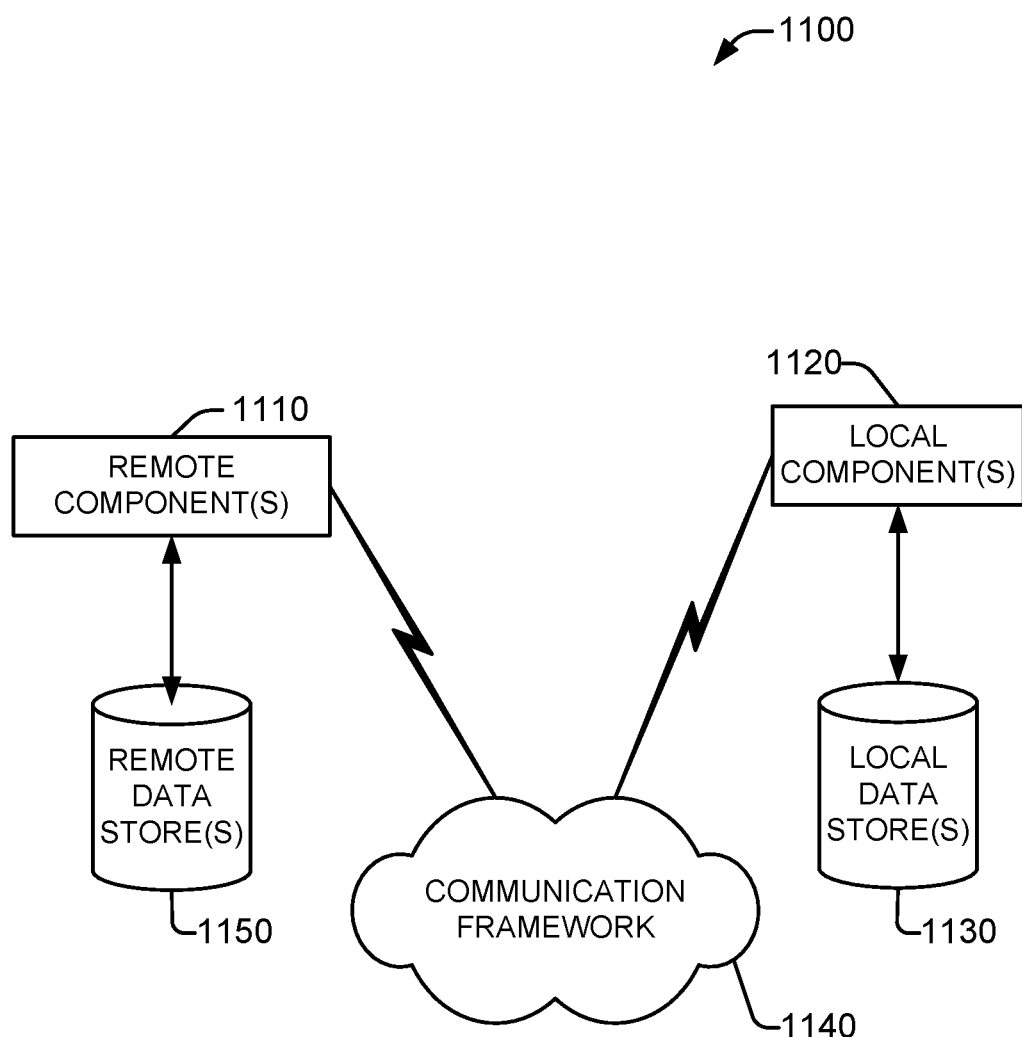
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
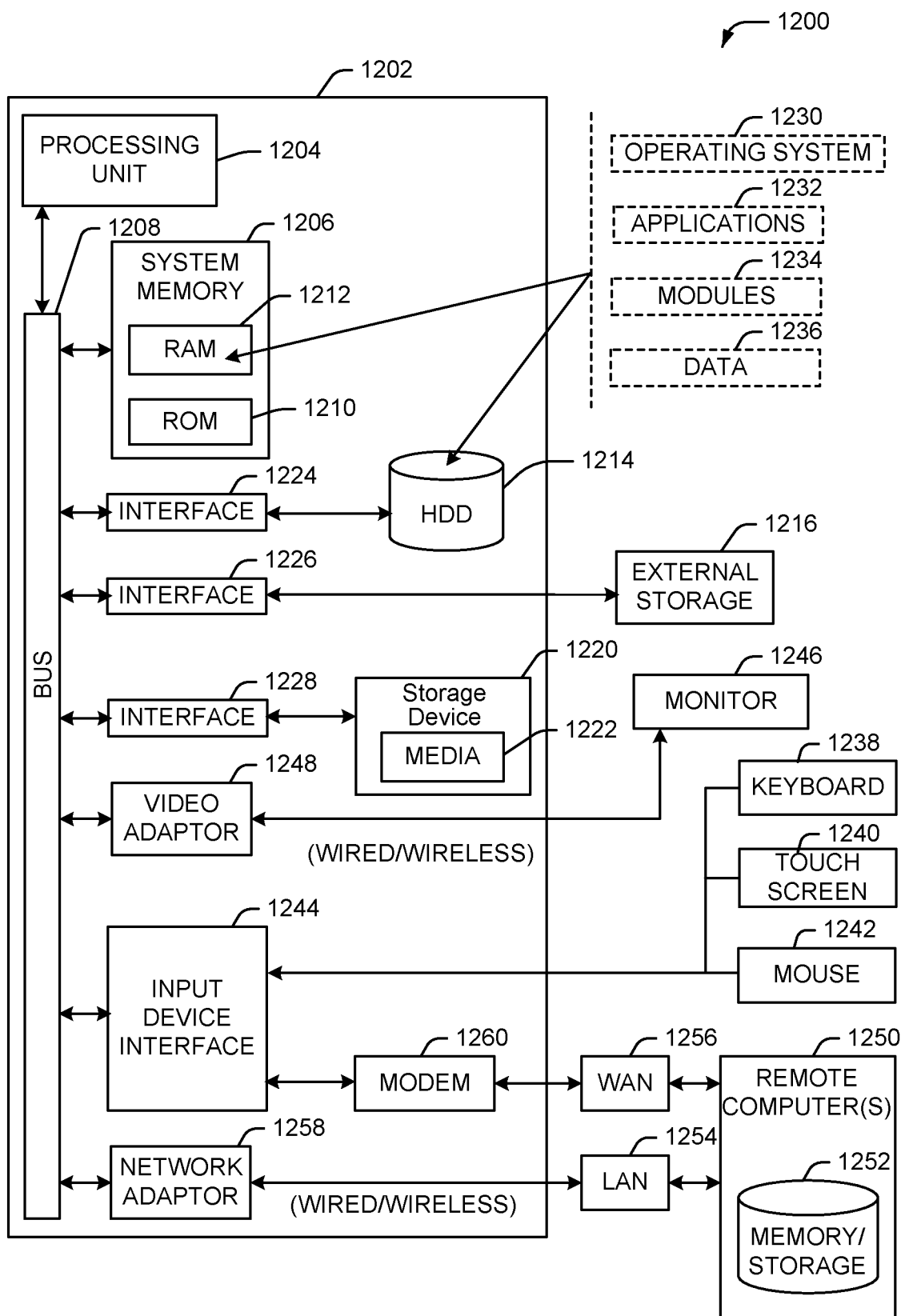
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (loT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1194 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
storing a data stream as a hierarchical structure, in which epochs of the data stream are hierarchically higher than segments of the data stream, and the segments are hierarchically higher than data chunks containing event data of the data stream; and
recovering the data stream based on the hierarchical structure, comprising recreating the epochs of the data stream, recreating the segments of the data stream, associating the segments with the epochs based on the hierarchical structure, and associating the data chunks with the segments based on the hierarchical structure.

2. The system of claim 1, wherein the hierarchical structure corresponds to a file system, wherein the epochs and segments form directories of the file system, and wherein the data chunks are files within the directories.

3. The system of claim 1, wherein each epoch is identified by a sequential number in the data stream.

4. The system of claim 1, wherein each segment is identified by a sequential number in the data stream.

5. The system of claim 1, wherein a segment is associated with two or more epochs.

6. The system of claim 1, wherein the recreating the segments of the data stream comprises determining whether a segment was created for an epoch, and, in response to determining that the segment was created for the epoch, instructing a segment store to create the segment in association with the epoch.

7. The system of claim 1, wherein the recreating the segments of the data stream comprises determining that a segment was created for a first epoch, and, in response to determining that the segment was created for the first epoch, adding an identifier of the segment to a second epoch following the first epoch.

8. The system of claim 1, wherein the operations further comprise sealing the segments, and creating a new epoch with a number of new segments corresponding to a number of segments of a last recreated epoch.

9. The system of claim 8, wherein the operations further comprise dividing a routing key space evenly among the number of new segments.

10. The system of claim 9, wherein the operations further comprise receiving an event comprising a routing key and payload, hashing the routing key to determine a matching segment to which the event is mapped, and appending the payload to the matching segment.

11. A system, comprising:
a processor; and
a memory that stores executable instructions that, when executed by the processor, facilitate performance of operations, the operations comprising:
maintaining data chunks that store event data of a data stream, the data stream comprising epochs and segments, in which each data chunk is associated with metadata representing an epoch and a segment corresponding to the chunk and indicating an ordering of the chunk within the segment; and
recovering the data stream, comprising processing metadata of the data chunks to recreate the epochs and segments of the data stream, and to reference respective data chunks within respective segments based on the ordering of the respective data chunks within the respective segments.

12. The system of claim 11, wherein the metadata associated with a chunk comprises a directory pathname and a filename, the directory pathname representing the epoch and segment of the chunk, and the filename of the chunk indicating the ordering of the chunk within the segment.

13. The system of claim 11, wherein a segment is identified by a data stream unique value that indicates a relative order of segment creation.

14. The system of claim 11, wherein the operations further comprise sealing the segments, and creating a new epoch with a number of new segments corresponding to a number of segments of a last recreated epoch.

15. A non-transitory machine-readable medium, comprising executable instructions that, when executed by a processor of a streaming data storage system, facilitate performance of operations, the operations comprising:

storing a first data chunk, comprising first events of a data stream, in a first directory location comprising a first pathname that is based on a first epoch and a first segment associated with the first data chunk;
storing a second data chunk, comprising second events of the data stream, in a second directory location comprising a second pathname that is based on the first epoch and a second segment associated with the second data chunk; and
recovering the data stream based on the first pathname and the second pathname, comprising recreating the first epoch, recreating the first segment in association with the first epoch, recreating the second segment in association with the first epoch, referencing the first data chunk from the first segment, and referencing the second data chunk from the second segment.

16. The non-transitory machine-readable medium of claim 15, wherein the operations further comprise storing a third data chunk in a third directory location comprising the first pathname, the third data chunk comprising third events of the data stream, wherein the name of the first data chunk within the first pathname and the name of the third data chunk within the first pathname indicate that the first events of the data stream are prior to the third events of the data stream.

17. The non-transitory machine-readable medium of claim 15, wherein the operations further comprise determining that the recovering of the data stream is complete, and, in response to the determining that the recovering of the data stream is complete, creating a new epoch with a number of active segments corresponding to a number of segments of a last recreated epoch.

18. The non-transitory machine-readable medium of claim 17, wherein the operations further comprise sealing the segments of the last recreated epoch.

19. The non-transitory machine-readable medium of claim 17, wherein the operations further comprise dividing a routing key space evenly among the number of active segments.

20. The non-transitory machine-readable medium of claim 19, wherein the operations further comprise receiving an event comprising a routing key and payload, hashing the routing key to determine a matching active segment to which the event is mapped, and appending the payload to the matching active segment.

* * * * *